United States Patent
Simon et al.

(10) Patent No.: US 6,803,708 B2
(45) Date of Patent: Oct. 12, 2004

(54) BARRIER METAL LAYER FOR A CARBON NANOTUBE FLAT PANEL DISPLAY

(75) Inventors: Kang Simon, San Jose, CA (US); Bae Craig, San Jose, CA (US); Kim Jung Jae, San Jose, CA (US)

(73) Assignee: cDream Display Corporation, San Jose, CA (US)

( * ) Notice: Subject to any disclaimer, the term of this patent is extended or adjusted under 35 U.S.C. 154(b) by 103 days.

(21) Appl. No.: 10/226,405

(22) Filed: Aug. 22, 2002

(65) Prior Publication Data

US 2004/0036400 A1 Feb. 26, 2004

(51) Int. Cl.$^7$ .................................................. H01J 1/05
(52) U.S. Cl. ...................... 313/311; 313/309; 313/310; 313/336; 313/351; 313/495
(58) Field of Search ............................... 313/309, 310, 313/311, 336, 351, 495

*Primary Examiner*—Vip Patel
(74) *Attorney, Agent, or Firm*—Fenwick & West LLP

(57) ABSTRACT

A flat panel display and a method for forming a carbon nanotube based flat panel display. In one embodiment, the flat panel display includes a barrier layer formed between a catalyst layer upon which microstructures of carbon nanotubes are formed and a resistor layer. The barrier layer acts as an anti diffusion layer between the catalysts layer and the resistor layer to prevent the catalyst layer from diffusing into the resistor layer during the growing of the carbon nanotubes. The barrier layer also enhances the adhesion characteristics of the catalyst layers to enable the uniform growth of the carbon nanotube structures on the catalyst layer.

14 Claims, 9 Drawing Sheets

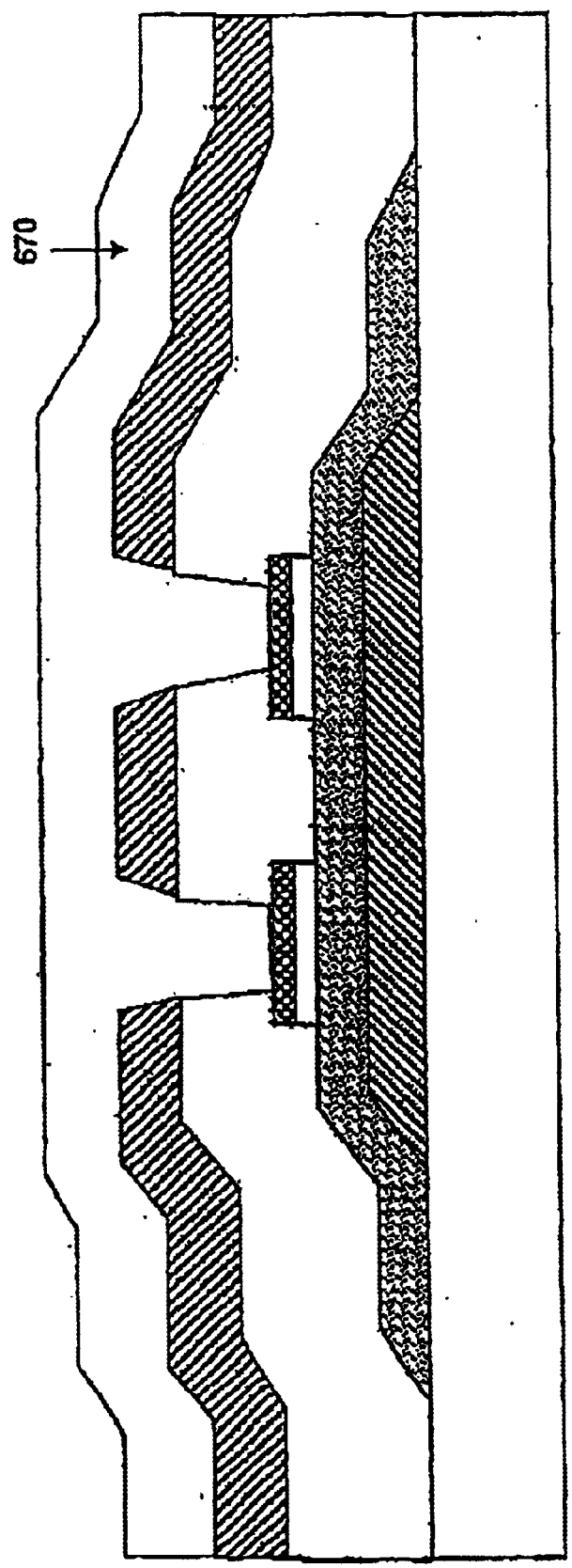

BARRIER METAL LAYER FOR A CARBON NANOTUBE FLAT PANEL DISPLAY

TECHNICAL FIELD

The present claimed invention relates to the field of flat panel displays. More specifically, the present claimed invention relates to a flat panel display and methods for forming a flat panel display having a barrier metal for electron emission.

BACKGROUND ART

A Cathode Ray Tube (CRT) display generally provides the best brightness, highest contrast, best color quality and largest viewing angle of prior art computer displays. CRT displays typically use a layer of phosphor which is deposited on a thin glass faceplate. These CRTs generate a picture by using one to three electron beams which generate high energy electrons that are scanned across the phosphor in a raster pattern.

The phosphor converts the electron energy into visible light so as to form the desired picture. However, prior art CRT displays are large and bulky due to the large vacuum envelopes that enclose the cathode and extend from the cathode to the faceplate of the display. Therefore, typically, other types of display technologies such as active matrix liquid crystal display, plasma display and electro-luminescent display technologies have been used in the past to form thin displays.

Recently, a thin flat panel display (FPD) has been developed which uses the same process for generating pictures as is used in CRT devices. These flat panel displays use a backplate including a matrix structure of rows and columns of electrodes. One such flat panel display is described in U.S. Pat. No. 5,541,473 which is incorporated herein by reference. Flat panel displays are typically matrixed-addressed and they comprise matrix addressing electrodes. The intersection of each row line and each column line in the matrix defines a pixel, the smallest addressable element in an electronic display.

The essence of electronic displays is the ability to turn on and off individually picture elements (pixels). A typical high information content display will have about a quarter million pixels in a 33 cm diagonal orthogonal array, each under individual control by the electronics. The pixel resolution is normally just at or below the resolving power of the eye. Thus, a good quality picture can be created from a pattern of activated pixels.

One means for generating arrays of field emission cathode structures relies on well established semiconductor microfabrication techniques. These techniques produce highly regular arrays of precisely shaped field emission tips. Lithography, generally used in these techniques, involves numerous processing steps, many of them wet. The number of tips per unit area, the size of the tips, and their spacing are determined by the available photoresists and the exposing radiation.

Tips produced by the method are typically cone-shaped with base diameters on the order of 0.5 to 1 $\mu$m, heights of anywhere from 0.5 to 2 $\mu$m, tip radii of tens of nanometers. This size limits the number of tips per pixel possible for high resolution displays, where large numbers (400–1000 emitters per pixel) are desirable for uniform emission to provide adequate gray levels, and to reduce the current density per tip for stability and long lifetimes. Maintaining two dimensional registry of the periodic tip arrays over large areas, such as large TV-sized screens, can also be a problem for gated field emission constructions by conventional means, resulting in poor yields and high costs.

U.S. Pat. No. 4,338,164 describes a method of preparing planar surfaces having a microstructured protuberances thereon comprising a complicated series of steps involving irradiation of a soluble material (e.g., mica) with high energy ions, as from a heavy ion accelerator, to provide column-like traces in the matrix that are subsequently etched away to be later filled with an appropriate conductive, electron-emitting material. The original soluble material is then dissolved following additional metal deposition steps that provide a conductive substrate for the electron emitting material. The method is said to produce up to $10^6$ emitters per cm$^2$, the emitters having a diameter of approximately 1–2 $\mu$m.

U.S. Pat. No. 5,266,530 describes a gated electron field emitter prepared by a complicated series of deposition and etching steps on a substrate, preferably crystalline.

FIG. 1 is a prior art flat CRT cathode of tungsten as a thermionic electron source are placed on a substrate. Scan electrons and data electrodes are formed on a glass plate having a plurality of holes at pixel locations. The electrodes with predetermined voltages applied thereto selectively pass the electrons emitted from the line cathode so that the electrons accelerate toward a screen and excite phosphors coated on the inner surface of the screen. Different types of emitters have been suggested in the past for the flat CRT shown in FIG. 1.

Among these different emitters is the use of carbon nanotubes. In the carbon nanotube displays, a patterned of microstructures are disposed on a row electrode so that when voltage is applied to between the row electrode and a column electrode, electrons are emitted from the cathode to the screen to excite the phosphors on the screen to create images.

FIG. 2 shows a schematic (cross-sectional view) of a portion of a prior art matrixed addressed ungated field emission display device 10 including cathode 20, for one embodiment of the invention. Patterned microstructure layer 12 disposed on row conductors 16 which are supported by substrate 14 provides cathode 20. Transparent column conductors 18 generally indium ion oxide (ITO) are disposed on substrate 22, preferably glass. Which supports a layer of continuous or discontinuous phosphor material 23 and which comprises anode 24 of the invention. Phosphor material 23 is capable of excitation by electrons. Upon applying a voltage from voltage source 26, there results a high electric filed being applied to the emission sites of microstructured layer 12. This causes a flow of electrons across low pressure gas or vacuum gap 28 between column conductors 18 and row conductors 16.

FIG. 3 is another prior art example of a gated matrixed addressed field emission display device 30. The device includes a gated cathode 32 which includes a conductive gate columns 34, insulated spacers 36, patterned microstructured layer 38, deposited on and in electrical contact with row conductors 40 which are supported on substrate 41, generally glass. Cathode 32 is spaced apart from anode 42 by low pressure gas or preferably vacuum gap 44, the space between phosphor 50 and cathode 32. Anode 42 includes substrate 46 on which is located a transparent phosphor containing layer 50.

FIG. 4 shows a cross sectional view of a portion of a prior art carbon nanotube CRT display. The display in FIG. 4 includes a gated cathode, a patterned microstructure layer consisting of carbon nanotube structures, insulated spacers, a patterned microstructure layer deposited on it and electrical contact with row conductors which are supported on the substrate. Cathode is spaced apart from an node structure by a low pressure vacuum. The anode comprises a faceplate, a conductor layer and phosphor which when bombarded with electrons emitted from the cathode excites the phosphor. The nanotube structure shown in FIG. 4 typically includes a resistive layer between the cathode conductors and the microstructure emissive elements. The microstructure emissive elements and the resistive layer are typically constructed in a planar configuration.

FIG. 5 is another example of a carbon nano-tube field emission display device of the prior art. The field emitter of FIG. 5, illustrates a multi-layer structure 300 which is a cross sectional view of a portion of an FED flat panel display. The multi-layer structure 100 comprises a field emission backplate structure 110. An image is generated at faceplate structure 160.

The backplate structure 110 generally comprises of a patterned emitter electrode 120, a resistor layer 115, an electrically insulating layer 140, a gate layer 150 and electron-emissive elements 140 situated in an aperture through insulating layer 135. The electron-emissive elements 140 are carbon based material.

The backplate 110 also includes a catalyst layer upon which the electron-emissive elements 140 are situated. The resistive layer 115 and the catalyst layer 120 gives the structure 100 the uniformity of emitter elements formation that is required to generate the proper imagery in the display. Although the structure 100 shown in FIG. 5 has a vertical structural construction, the catalyst layer and the resistor layer 115 may be fabricated to be planar.

It is typical in the prior art device shown in FIG. 5 to have a nickel (Ni) material as the catalyst layer and a silicon based material (Si) as the resistor layer 115. The catalyst material, in this case Ni, interfaces directly with the resistor 115 material. The interfacing between the catalyst 120 and resistor 115 materials results in a poly-crystalazition process from the inter-diffusion between the catalyst material and the resistor 115 material. The poly-crystallization process often results in lowering the resistive value of the resistor material 115. The poly-crsyatilization of the Ni catalyst and the Si resistor also affects the adhension capabilities of catalyst layer. As the catalyst layer diffuses into the resistor layer 115, the catalyst layer loses the ability to act as an effective adhension layer between the emitter elements 140 and the resistor layer 115. Weakening the adhension capabilities of the catalyst layer makes it difficult to grow the emitter elements 140 and results in a costly fabrication process.

SUMMARY OF THE INVENTION

These and other objects and advantages of the present invention will no doubt become obvious to those of ordinary skill in the art after having read the following detailed description of the preferred embodiments which are illustrated in the various drawing figures.

The present invention furnishes an electron-emitting device having a metal barrier layer patterned to meet the foregoing needs. The present barrier layer contains multiple laterally separated sections situated between electron-emissive elements, on one hand, and emitter electrodes, on the other hand. More specifically, the barrier layer is situated on sections of a catalyst layer. The sections of the catalyst layer are spaced apart along each emitter electrode.

The present invention provides an electron field emission display including an electrode comprising a cathode, a layer comprising a dense array of discrete solid microstructures disposed on at least a portion of one or more surfaces of a substrate, the microstructures having an a real number of density greater than $10^6/cm^2$. A portion of the microstructure conformally is over-coated with one or more electron emitting material.

The display further includes an electric field producing structure that comprises first and second conductive electrodes insulately spaced apart and substantially parallel to each other. The first conductive electrode comprises a layer of electron emitting elements, preferably made of nano-structures of carbon, a resistor layer, a catalyst layer to provide emitter distribution unformity and a metal barrier layer that acts as an adhesive layer between the catalyst layer and the resistor layer. The metal layer also acts as an anti-diffusion layer between the resistor and the catalyst layers.

A preferred method of making an electrode for a field emission display device of the present invention comprises the step of providing matirx addressable substrate To manufacture an electron-emitting device that employs the metal barrier layer of the invention, a structure is typically first provided in which a control electrode overlies a dielectric layer that overlies an electrically conductive catalyst layer overlying an emitter electrode. Electron-emissive elements are situated in a composite opening extending through the control electrode and dielectric layer in the structure so that the electron-emissive element overlies the catalyst layer above the emitter electrode. Creation of the metal barrier sections involves removing portions of the catalyst layer located generally below spaces situated to the sides of the control electrode.

The removing step is normally performed by etching the barrier layer through a mask formed at least partially with the catalyst layer. By utilizing this technique, there is typically no need to perform a separate masking step in order to pattern the catalyst layer into separate sections along the emitter electrode. Also, in the embodiment where portions of the barrier layer are spaced laterally apart below the barrier layer, the barrier layer can be initially patterned using the mask typically employed in patterning an emitter layer to form the emitter electrode. Again, there is no need to perform an extra masking step to provide this initial patterning to the catalyst layer. The net result is that the desired pattern can be provided in the barrier layer without increasing the number of masking steps.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

PRIOR ART

PRIOR ART

PRIOR ART

Figure 1:
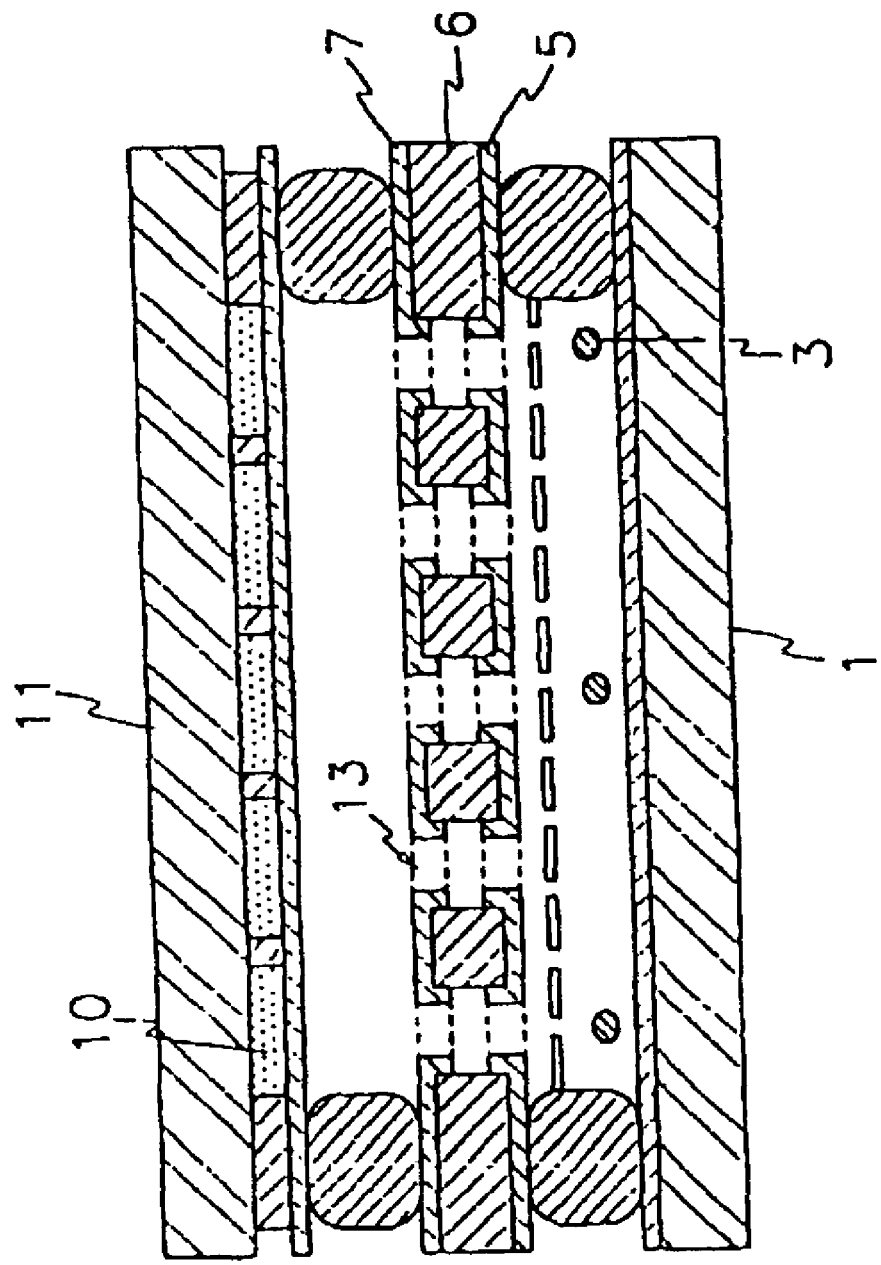
FIG. 1 is a cross sectional view illustrating a prior art flat CRT display device.
Figure 2:
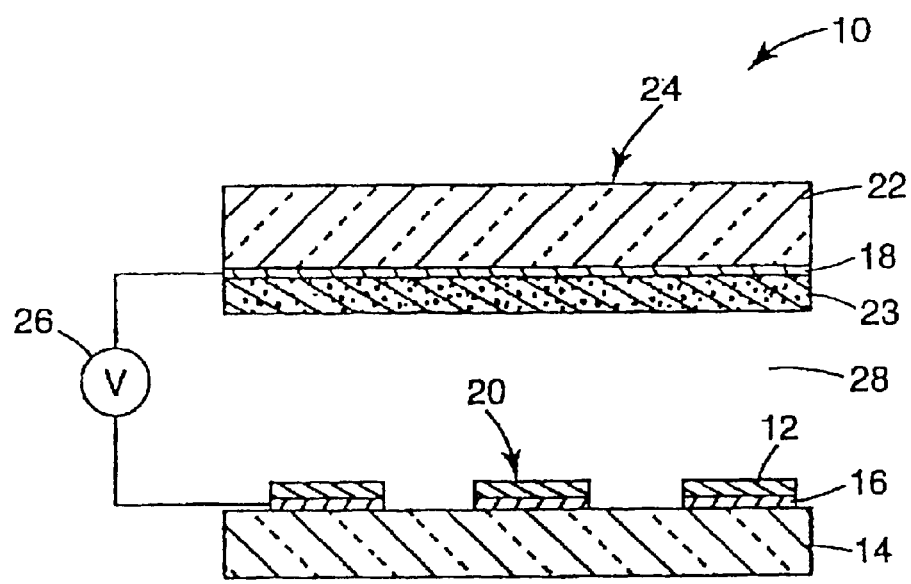
FIG. 2 is a cross sectional view illustrating a prior art matrixed addressed ungated field emission display device.
Figure 3:
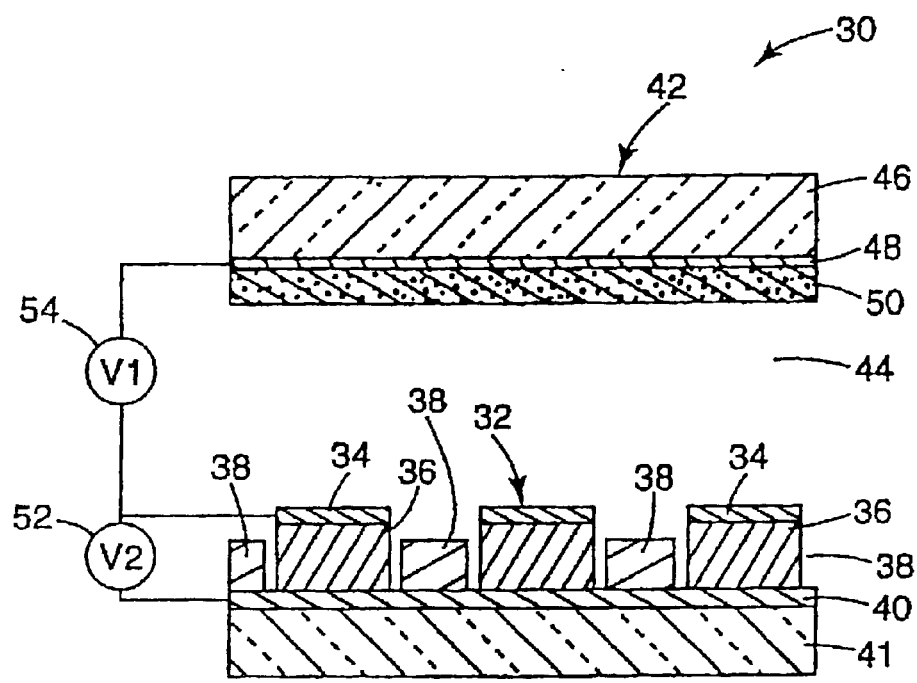
FIG. 3 is a cross sectional view illustrating a prior art matrixed addressed gated filed emission display device.
Figure 4:
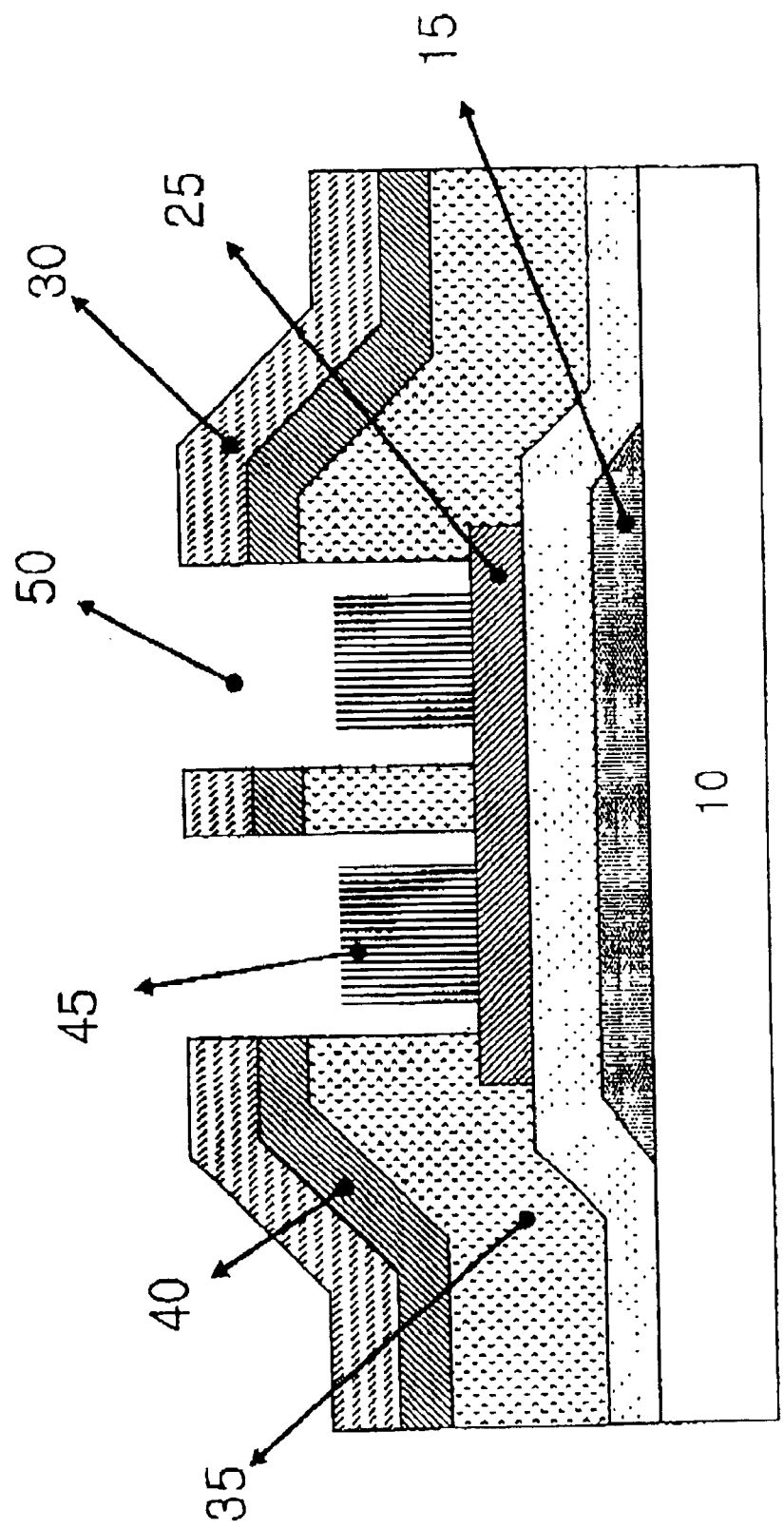
FIG. 4 is a cross sectional view illustrating a prior art carbon nanotube display device.
Figure 5:
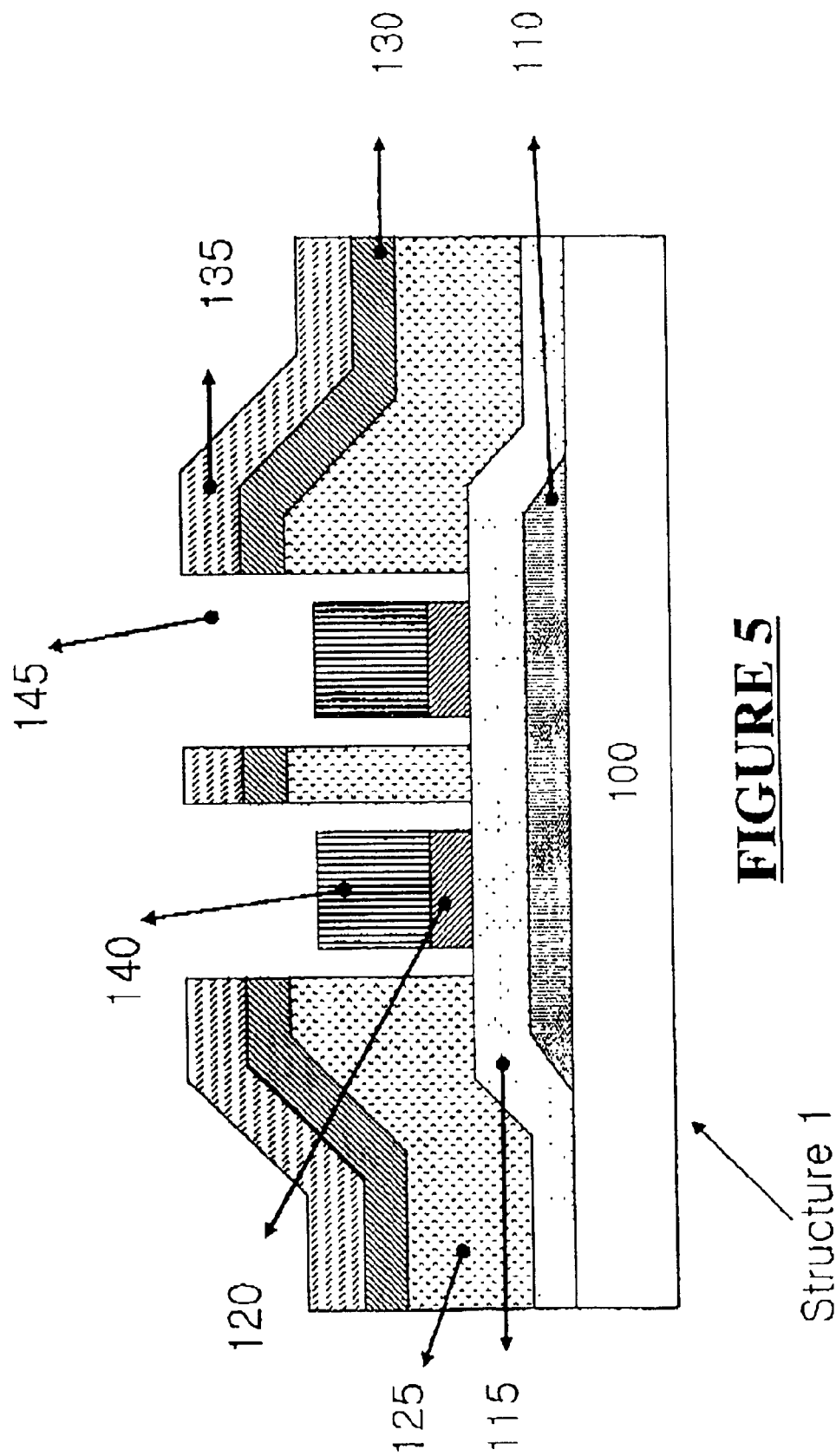
Figure 6A:
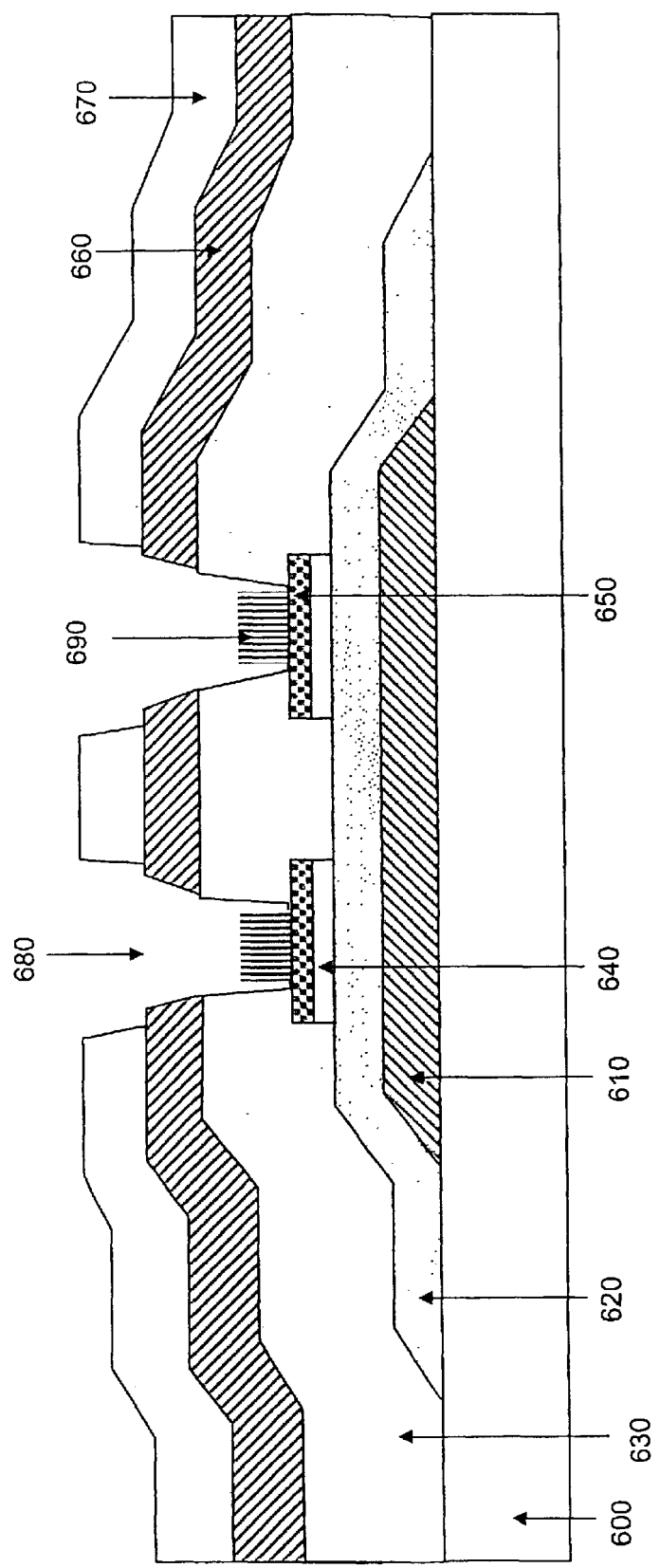

PRIOR ART FIG. 5; is a cross sectional view illustrating a prior art carbon nanotube field emission display device;

FIG. 6A is one embodiment of the carbon nanotube field emission display device of the present invention; and FIGS. 6B–6G are cross sectional structural views represent steps in manufacturing an embodiment of the carbon nanotube electron emitting device of the present invention.

Like reference symbols are employed in the drawings and in the description of the preferred embodiments to represent the same, or very similar items or item.

BRIEF DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

FIG. 6A illustrates the core of a matrix-addressed field emitter that contains a vertical emitter conductor patterned into conductor strips in a vertically aligned manner according to the invention. The cross sections of FIG. 6A is taken through perpendicular planes. The field emitter of FIG. 6A is created from a flat electrically insulating baseplate (substrate) 600 typically consisting of glass having a thickness of approximately 1 mm. To simplify the pictorial illustration, baseplate 600 is not shown in the perspective view of FIG. 6A.

Figure 6B:
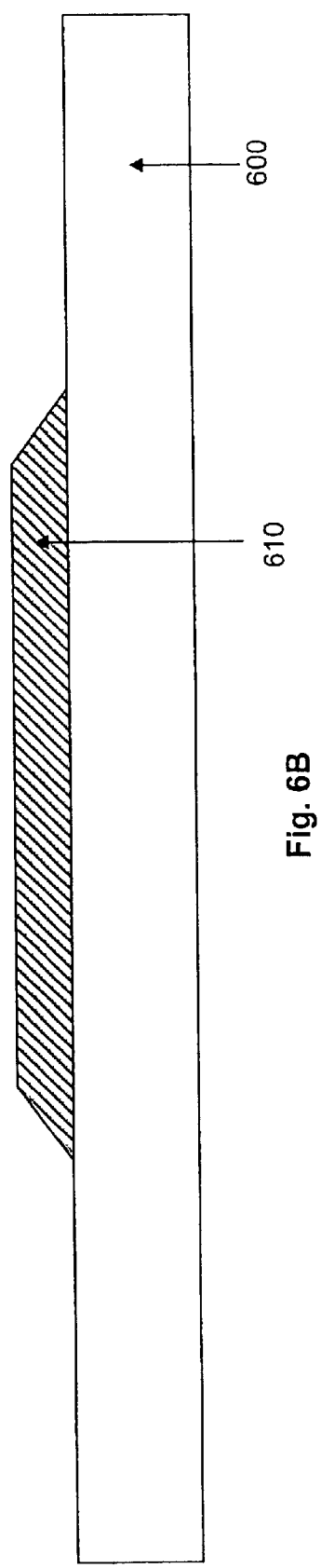

A group of generally parallel emitter electrodes 610 are situated on baseplate 600 as shown in FIG. 6B. Emitter electrodes 610 extend in the row direction and constitute row electrodes. As shown in FIG. 6B, each emitter electrode 610 has a transverse profile roughly in the shape of an upright isosceles trapezoid. This profile helps improve step coverage of layers formed above emitter electrodes 610.

Emitter electrodes 610 typically consist of aluminum, molybdenum, or chromium, or an alloy of any of these metals. Emitter electrodes 610 are typically about 1000–5000Å in thickness.

In one embodiment of the present invention, the emitter electrode 610 is deposited in-situ by a number of well known deposition methods of the prior art. In one embodiment. Sputter deposition may be used.

Upon deposition of the emitter electrode 610, a photo-resistive mask agent (PR) masks the emitter electrode 610 according to a designed patterned. The photo-resistive mask is then soft baked. After masking and baking the photo-resistive mask, the emitter electrode 610 is etched by a number of photolithographic processes well known in the art accordingly. Applicable etching methods include wet etching. Remaining PR maskant is stripped off by methods well known in the art.

Figure 6C:
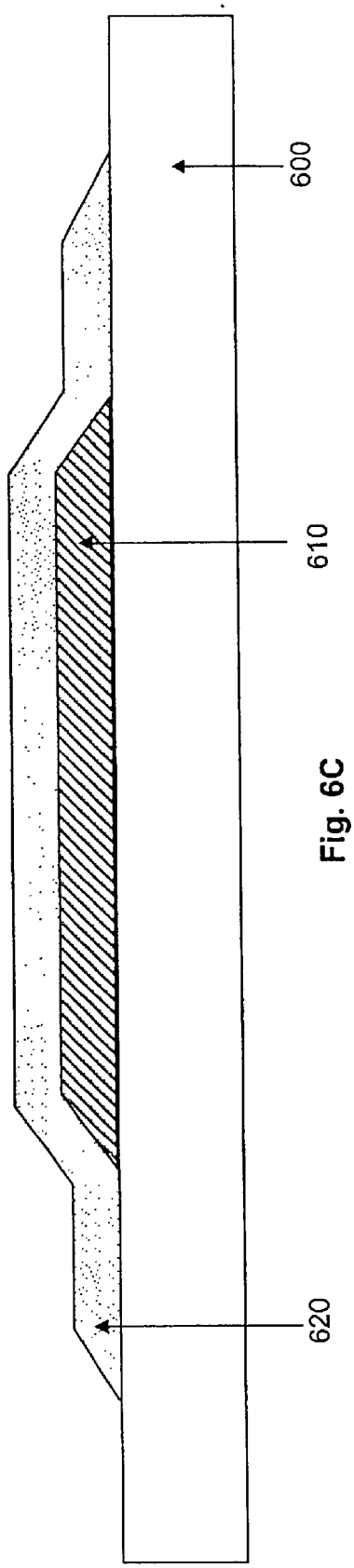

A resistor layer 620 is then fabricated by deposition of a layer of resistive material on the emitter electrode layer 610 and remaining surfaces of the glass 600 uncovered by the emitter electrode 610 material as shown in FIG. 6C. In one embodiment of the present invention, the resistor layer 620 is formed like an island at each pixel along the surface of the emitter electrode 610. In one embodiment of the present invention, the resistor layer 620 is deposited by a number of well known methods in the art. In one embodiment, deposition of the resistor layer 620 is accomplished by plasma enhanced chemical vapor deposition (PECVD) method.

Upon deposition of the resistor layer 620, a photo-resistive masking agent (PR) masks the resistor layer 620. After masking, the resistor layer 620 is soft baked and exposed. The resistor layer 620 is subsequently developed by hard baking and dry etching to conform to the contours of the surface of the glass 600. Remaining PR maskant is stripped by methods well known in the art.

Figure 6D:
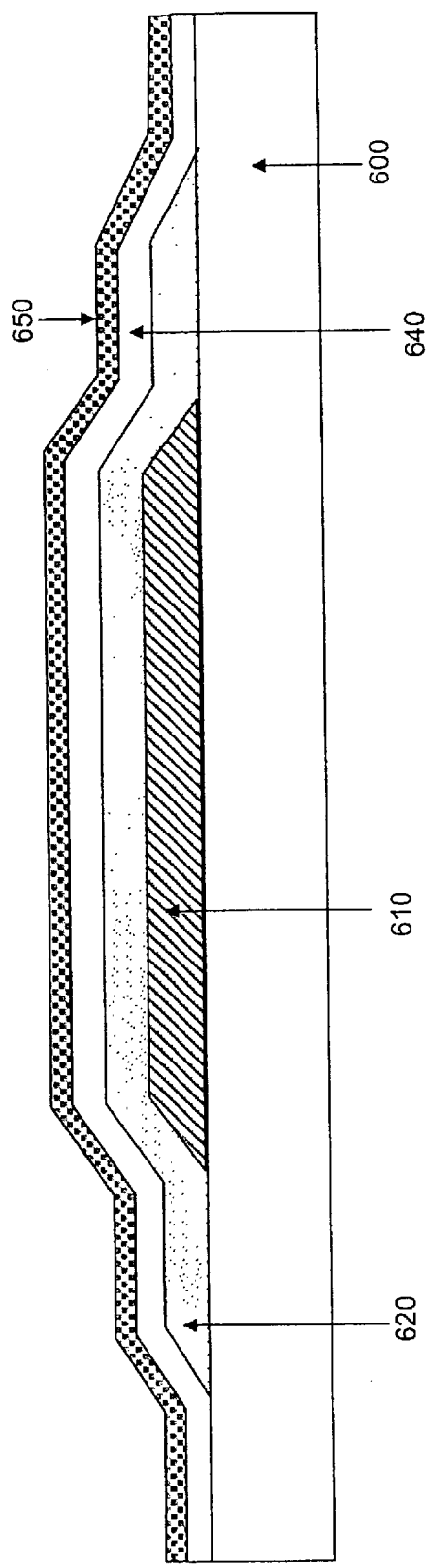

A patterned barrier layer 640 and a catalyst layer 650 are then fabricated by deposition of a layer of molybdenum and a conductive metal respectively on the resistor layer 620 as shown in FIG. 6D. In one embodiment of the present invention, the barrier layer 640 is deposited by a number of well known methods in the art. In one embodiment, deposition of the barrier layer 640 is accomplished by the use of a sputter deposition method. In one embodiment of the present invention, the barrier layer is formed of titanium tungsten (TiW).

In another embodiment of the present invention, the barrier layer is formed of titanium nitride (TiN). In one embodiment of the present invention, the barrier layer is formed of tungsten (W). In one embodiment of the present invention, the barrier layer 640 acts as an anti-diffusion layer between the resistor layer 620 and a catalyst layer upon which the carbon nanotube emissive elements of the present invention are disposed. The barrier layer 640 thus protects the catalyst layer material from diffusing into the resistor layer 620. In another embodiment of the present invention, the barrier layer 640 enhances the adhesion capabilities of the catalyst layer 650 to enable the carbon nanotube electron emissive elements to adhere to the catalyst layer 650.

Figure 6E:
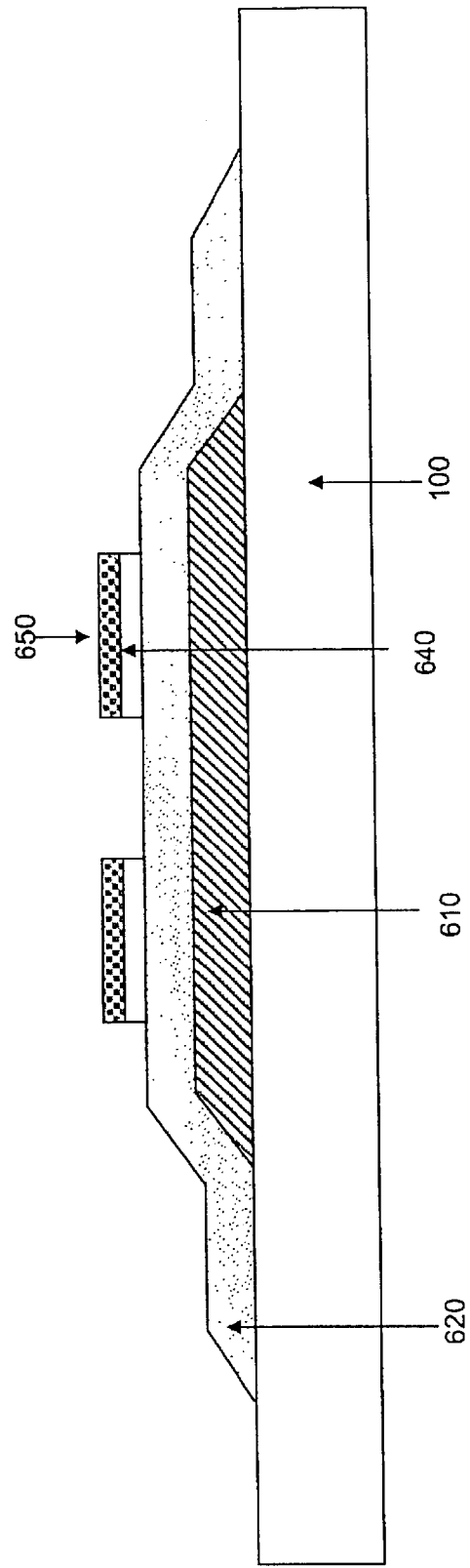

The catalyst layer 650 is patterned into a group of laterally separated generally parallel strips 650 is situated on top of the barrier layer 640 as shown in FIG. 6E to form a catalyst layer for the deposition of the carbon nanotube electron emissive elements thereon. Catalyst strips 650 extend in the column direction and are spaced apart along each emitter electrode 610. Each catalyst strip 650 extends over all of electrodes 610. Consequently, strips 650 overlie laterally separated parts of each electrode 610. Strips 650 are vertical conductors in that current flows through strips 650 largely in the vertical direction between electrodes 610 and the overlying electron-emissive elements described below.

Each of catalyst strips 650 typically consists of nickel, iron, cobalt, or the alloys of these metals. In another embodiment the catalyst layer consist of cobalt. The thickness of the cobalt layer is 1 nm–200 nm.

Figure 6F:
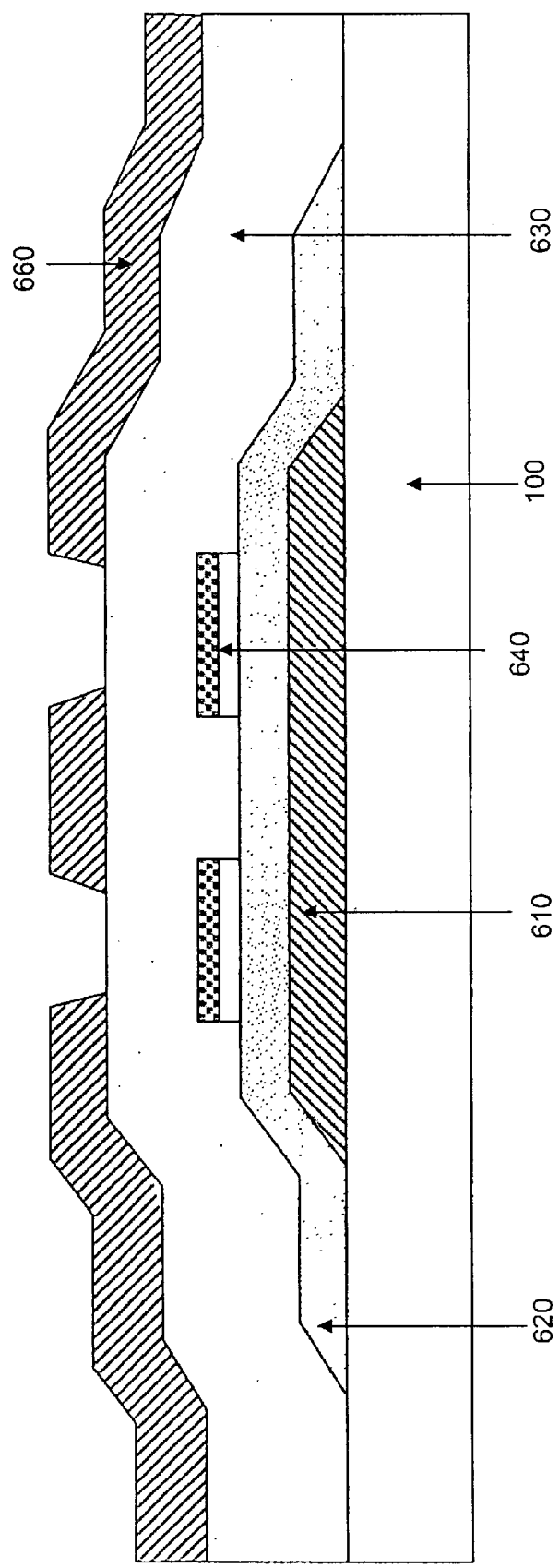

As shown in FIG. 6F, a blanket dielectric layer 630 is formed on the surface of the catalyst layer 650 and the resistor layer 620 covering portions of the resistor layer 620 that are left uncovered by the barrier layer 640. A patterned dielectric layer consisting of a group of laterally separated generally parallel strips 630 overlying the catalyst strips 650 is subsequently formed. Each dielectric strip 630 lies fully on a corresponding one of catalyst strips 650. The longitudinal side edges of each dielectric strip 630 are in approximate vertical alignment with the longitudinal side edges of corresponding resistive strip 620. Dielectric strips 630 typically consist of silicon oxide having a thickness of 1.5 $\mu$m. In another embodiment, dielectric strips 630 consist of silicon nitride having a thickness of 1.5 $\mu$m.

A blanket electrically non-insulating gate layer 670 is formed on dielectric layer 630 as also shown in FIG. 6G. Gate layer 670 is typically created by sputter depositing chromium or aluminum on dielectric layer 630.

A photoresist mask bearing the pattern intended for the main control portions is formed on gate layer 670. The exposed portions of layer 670 are removed with a chemical etchant. Alternatively, a plasma can be employed to remove the exposed portions of layer 670. The patterned remainder of layer 670 consists of a group of laterally separated main control portions extending in the column direction.

An array of rows and columns of main control openings 680 extend through main control portions 670 down to dielectric layer 630. One main control opening 680 is provided for each set of electron-emissive elements 690. In particular, one main control opening 680 is present at each location where a main control portion 670 crosses over an emitter electrode 610.

Gate openings that implement control openings 680 are formed at multiple locations through each of the portions of gate layer 670 that span main control openings 680.

Using gate layer 670 as an etch mask, dielectric strips 630 are etched through gate openings 680 to form dielectric openings. FIG. 6A shows the resultant structure. The etch to create gate openings 680 is normally performed in such a manner that the dielectric openings undercut gate layer 670 somewhat. The amount of undercutting is sufficiently great to avoid having the layer-deposited emitter cone material accumulate on the side-walls of dielectric openings and electrically short electron-emissive elements 690 to the gate material.

Electron-emissive carbon nanotube 690 are now formed in composite openings 680. Various techniques can be employed to create the carbon nanotubes 690. In one technique, the desired emitter material, typically carbon, is evaporatively deposited on top of the structure in a direction generally perpendicular to the upper surface of faceplate 600. The emitter material accumulates on the catalyst conductive layer 650 and passes through gate openings 680 to accumulate on the conductive strips 650.

During field emitter operation, the voltages on electrodes 610 and 660 are controlled in such a way that control electrodes 660 extract electrons from electron-emissive elements 690 in selected ones of the electron-emissive-element sets. An anode in the light-emitting device (not shown here) situated opposite elements 690 draws the extracted electrons towards light-emissive elements located close to the anode. As electrons are emitted by each activated electron-emissive element 690, a positive current flows through underlying catalyst strip 650 to underlying emitter electrode 610.

Catalyst strips 650 provide the field emitter with electron emission uniformity and short circuit protection. Specifically, strips 650 limit the maximum current that can flow through activated electron-emissive elements 690. Since the positive current flowing through each activated element 690 equals the electron current supplied by that element 690, strips 650 limit the number of electrons emitted by activated elements 690. This prevents some of elements 690 from providing many more electrons than other of elements 690 at the same extraction voltage and thus prevents undesirable bright spots from occurring on the viewing surface of the flat-panel display.

Also, if one of gate electrodes 670 becomes electrically shorted to underlying conductive strip 650 and thus becomes electrically coupled to underlying emitter electrode 610, catalyst strip 650 at the short circuit location significantly limits the current flowing through the short circuit connection. The vertical conductance of strip 650 at the short circuit location is so high that substantially all of the normal voltage drop between electrodes 660 and 610 at the short circuit location occurs across the intervening portion of conductive strip 650. With proper electron-emitter design, the presence of the short circuit does not detrimentally affect the operation of any of the other sets of electron-emissive elements 690.

Such a short circuit can arise by way of a conductive path created through a dielectric strip 630 or by having one or more of electron-emissive elements 690 come into contact with their gate electrode 670. In the case of a control-electrode-to-electron-emissive-element short circuit, each shorted electron-emissive element 690 is normally defective. However, conductive strips 650 limit the current through each shorted elements 690 sufficiently that non-shorted elements 690 in that set of electron-emissive elements normally still operate in the intended manner. Catalyst strips 650 thus normally enable a set of electron-emissive elements 690 containing a small percentage of shorted elements 690 to perform the intended electron-emitting function in an adequate manner. Electron-emission uniformity is substantially maintained.

The electron emmitters produced according to the invention can be employed to make flat-panel devices other than flat-panel CRT displays. Likewise, the present electron emitters can be used as electron sources in products other than flat-panel devices. Various modifications and applications may thus be made by those skilled in the art without departing from the true scope and spirit of the invention as defined in the appended claims.

What is claimed is:

1. A flat panel display including a faceplate having an active area surface and a backplate having an active area surface, said faceplate attached to said backplate so as to define an active area peripherally surrounded by a border area, said flat panel display comprising:
   a catalyst layer;
   a resistor layer;
   a plurality of carbon nanotube electron emission elements disposed on said catalyst layer; and
   a barrier layer inter-disposed between said catalyst layer and said resistor layer to prevent said catalyst layer from diffusing into said resistor layer during formation of said plurality of carbon nanotubes on said catalyst layer.

2. The flat panel display of claim 1, wherein said barrier layer is formed of molybdenum.

3. The flat panel display of claim 1, wherein said barrier layer is formed of titanium tungsten.

4. The flat panel display of claim 1, wherein said barrier layer if formed of titanium nitride.

5. The flat panel display of claim 2, wherein said barrier layer is formed of an alloy of molybdenum.

6. The flat panel display of claim 3, wherein said barrier layer is formed of an alloy of titanium tungsten.

7. The flat panel of claim 4, wherein said barrier layer is formed of an alloy of titanium nitride.

8. The flat panel display of claim 1, wherein said barrier layer is formed by sputter disposition.

9. A field emission display device comprising:
   a plurality of carbon nanotube emission elements;
   a catalyst layer having said plurality of carbon nanotube emission elements disposed thereon;
   a resistor layer underlying said catalyst layer; and
   an inter-metal adhesion layer disposed between said catalyst layer and said resistor layer to enhance the adhesion characteristics of said catalyst layer during formation of said plurality of carbon nanotube emission elements on said catalyst layer.

10. The flat panel display of claim 9, wherein said inter-metal adhesion layer is formed of molybdenum.

11. The flat panel display of claim 9, wherein said inter-metal adhesion layer is formed of titanium tungsten.

12. The flat panel display of claim 9, wherein said inter-metal adhesion layer if formed of titanium nitride.

13. The flat panel display of claim 9, wherein said inter-metal adhesion layer is formed of an alloy of molybdenum.

14. The flat panel display of claim 9, wherein said inter-metal adhesion layer is formed of an alloy of titanium tungsten.

* * * * *